No. 808,507. PATENTED DEC. 26, 1905.
L. V. BLUE.
EGG SHELLER.
APPLICATION FILED APR. 25, 1903.
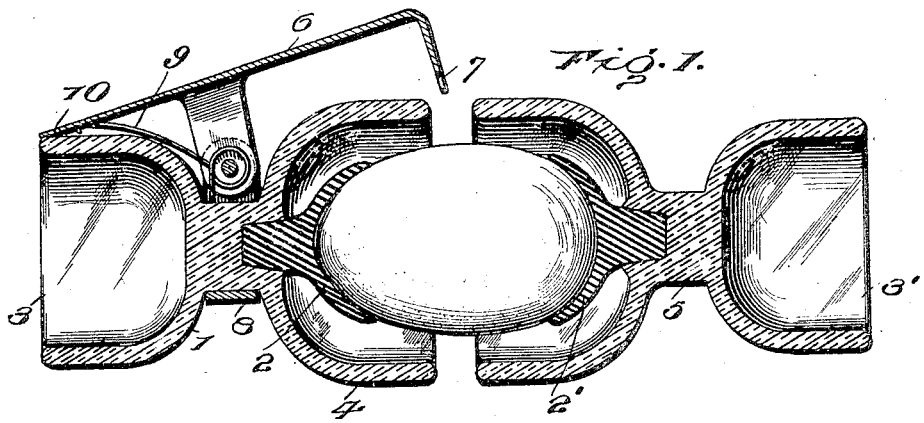
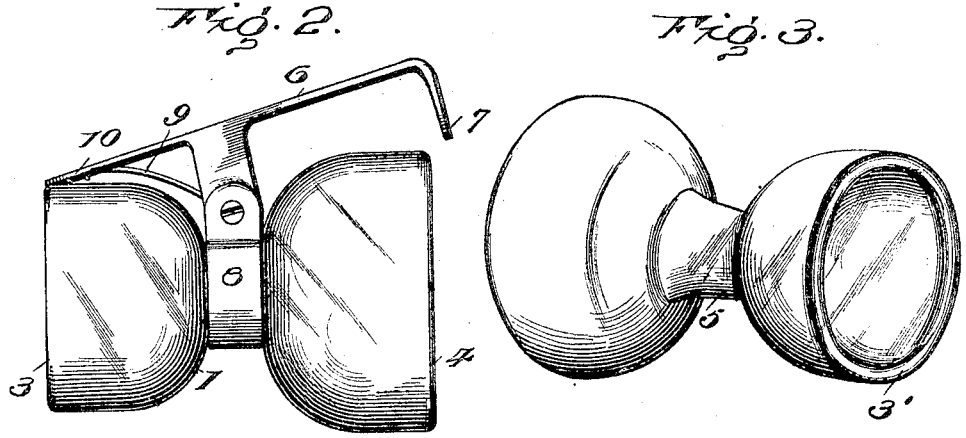
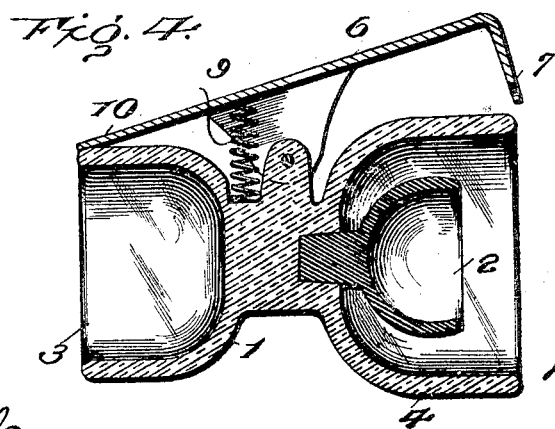

UNITED STATES PATENT OFFICE.

LOUIS V. BLUE, OF PITTSBURG, PENNSYLVANIA.

EGG-SHELLER.

No. 808,507.     Specification of Letters Patent.     Patented Dec. 26, 1905.

Application filed April 25, 1903. Serial No. 154,290.

*To all whom it may concern:*

Be it known that I, LOUIS V. BLUE, a citizen of the United States, residing at Pittsburg, in the county of Allegheny and State of Pennsylvania, have invented new and useful Improvements in Egg-Shellers, of which the following is a specification.

My invention relates to improvements in egg-shellers, and pertains to a device of the character hereinafter shown and described.

The object of my invention is to provide means for holding the egg while it is being cracked and to hold the two parts of the shell so that the contents thereof can be readily deposited in a suitable receptacle without the necessity of the operator holding the egg with his hands while it is being broken open and being emptied into the desired receptacle.

In the accompanying drawings, Figure 1 is a side elevation of a device which embodies my invention, showing the egg in position therein to be broken open. Fig. 2 is a detached view of one of the holding members and which carries a blade or other suitable device for cracking or breaking open the egg-shell. Fig. 3 is a detached view of the coöperating holding member. Fig. 4 is a view of a modification of my invention.

Referring now to the drawings, 1 indicates a holding member which is provided with means adapted to grasp and hold one end of the egg. The means here shown consists of a rubber cup 2, which is of a normal size, somewhat smaller than the end of the egg, whereby when the egg is forced therein the air is forced out of the cup, and the end of the egg-shell will be held therein by suction until it is broken or perforated for the purpose of admitting air to the cup, the operation of which is well understood. The member 1 may be of any suitable construction; but as here shown it is provided with a handle 3 of suitable construction, and the opposite end is provided with the glass cup 4. The egg holder or cup 2 is suitably connected to the member 1 and is embraced by the glass cup 4.

A coöperating holding member is provided, and this consists of a member 5, which is provided with a holder 2', like the holder 2, carried by the member 1, and is likewise provided with a suitable handle 3' and with a glass cup 4', which embraces the holder 2'. One of these members carries an implement 6, constructed to be brought in contact with the egg-shell for the purpose of breaking it.

As here shown, the member 6 is essentially L-shaped in side elevation, having a cutting-blade 7, adapted to be brought in contact with the egg-shell for the purpose of cracking and breaking the egg. The member 6 is pivoted to a band 8, which, as here shown, is passed around the neck or reduced portion of the member 1, and a suitable spring 9 serves to normally throw the blade 7 in contact with the egg-shell. The operator by depressing the end 10 of the member 6 against the tension of the spring 9 and then releasing it will cause the blade 7 to crack the egg-shell, as will be clearly seen from the illustration in Fig. 1. If desired, the band 8 can be loosely placed around the neck or reduced portion of the member 1, so that it can be turned around upon the member for the purpose of cracking or breaking the egg-shell entirely around the egg.

In operation one end of the egg is placed in one of the holders 2, the operator holding that member in one hand and taking the other member will force it down on the opposite end of the egg. This forcing operation serves to force the air out of the cups 2 and 2', whereby the two parts of the egg-shell will be held by the holders or cups after the egg has been broken open and the two parts of the shell separated and the contents of the egg deposited in the desired receptacle.

While I here show and prefer to use a holder of the form of a rubber cup, yet it will be readily understood that other forms of holders may be substituted therefor without departing from the spirit and scope of my invention.

By means of a device, as here shown, the egg can be broken without the hands of the operator coming in contact therewith during the breaking and the opening operation, thus avoiding the annoyance and inconvenience of having the fingers of the users soiled by the contact with the egg.

Having thus described my invention, what I claim as new, and desire to secure by Letters Patent, is—

1. A device of the character described, comprising a cup of a diameter greater than that of an egg, a cup-shaped rubber egg-holding member within the inner end of said cup, a band rotatably mounted on said cup, and a shell-cutting device carried by said band.

2. A device of the character described, comprising a cup of a diameter greater than that of an egg, a cup-shaped rubber egg-holding member within the inner end of said cup, a band surrounding the cup and rotatable thereon, a shell-cutting device intermediately pivoted to said band, and normally spring-held across the end of said cup.

3. A device of the character described, comprising a cup of a diameter considerably larger than that of an egg, a suction-cup carried by the inner end of said cup for holding the egg within the same and away from the side thereof and a rotatable knife mounted upon the cup and adapted to sever the egg.

4. A device of the character described, comprising a cup, means for positively holding the egg within the same, a band rotatably mounted upon the cup, a pivoted knife carried by said band, and a spring normally holding the knife in an inward-cutting position.

5. A device of the character described, comprising a cup having a reduced central portion, means for positively holding the egg within the cup, a band loosely surrounding said reduced central portion, a pivoted spring-actuated cutting member carried by the band.

6. A device of the character described, comprising a cup having a reduced central portion, means for positively holding the egg within the cup, a band loosely surrounding said reduced portion of the cup and having its ends turned laterally, a cutting member between said laterally-turned ends, a pivot passing through the said laterally-turned ends of the band and through the cutting member, and a spring surrounding said pivot and bearing against said knife and normally holding the same in an inward-cutting position.

7. A device of the character described, comprising a cup having a reduced central portion, a vacuum-cup in the lower end for positively holding the egg within the cup, a band loosely surrounding said reduced portion of the cup and having its ends turned laterally, a cutting member between said laterally-turned ends, a pivot passing through the said laterally-turned ends of the band and the cutting member, and a spring surrounding said pivot and bearing against said knife and normally holding the same in an inward-cutting position.

In testimony whereof I have hereunto set my hand in the presence of two subscribing witnesses.

LOUIS V. BLUE.

Witnesses:
M. McKEAG,
GEO. C. BROWN.